US008713166B2

(12) United States Patent
Smith et al.

(10) Patent No.: US 8,713,166 B2
(45) Date of Patent: *Apr. 29, 2014

(54) SYSTEMS AND METHODS FOR FACILITATING COMMUNICATION WITH FOUNDATION FIELDBUS LINKING DEVICES

(75) Inventors: Steven William Smith, Roanoke, VA (US); William Robert Pettigrew, Christianburg, VA (US)

(73) Assignee: General Electric Company, Schenectady, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/159,152

(22) Filed: Jun. 13, 2011

(65) Prior Publication Data

US 2012/0310387 A1 Dec. 6, 2012

Related U.S. Application Data

(60) Provisional application No. 61/491,625, filed on May 31, 2011.

(51) Int. Cl.
*G06F 15/173* (2006.01)

(52) U.S. Cl.
USPC .......................................... 709/224; 709/238

(58) Field of Classification Search
USPC ......... 709/208, 211, 245, 206, 223–224, 238, 709/249
See application file for complete search history.

(56) References Cited

U.S. PATENT DOCUMENTS

| 6,175,874 | B1 * | 1/2001 | Imai et al. ..................... 709/238 |
| 6,481,006 | B1 | 11/2002 | Blandy et al. |
| 6,912,671 | B2 | 6/2005 | Christensen et al. |
| 6,941,390 | B2 | 9/2005 | Odom |
| 7,340,574 | B2 | 3/2008 | Hall et al. |
| 7,343,448 | B2 | 3/2008 | Watanabe et al. |
| 7,369,912 | B2 | 5/2008 | Sherriff et al. |
| 7,370,239 | B2 | 5/2008 | Apel et al. |
| 7,530,113 | B2 | 5/2009 | Braun |
| 7,581,035 | B1 | 8/2009 | Oliveira et al. |

(Continued)

FOREIGN PATENT DOCUMENTS

| DE | 102007062914 A1 | 6/2009 |
| DE | 102009045055 A1 | 3/2011 |

(Continued)

OTHER PUBLICATIONS

Osztermayer, J. and Feser, K. "Condition Based Risk Management of Power System Asset," 2003.

(Continued)

*Primary Examiner* — Joshua Joo
(74) *Attorney, Agent, or Firm* — Sutherland Asbill & Brennan LLP

(57) ABSTRACT

Systems and methods for facilitating communication with Foundation Fieldbus linking devices are described. A plurality of Foundation Fieldbus linking devices may be identified by a gateway device that includes one or more computers. A single virtual address representative of the plurality of linking devices may be determined by the gateway device. Communications between the plurality of linking devices and an external system may the be facilitated by the gateway device, and the virtual address may be utilized to represent the plurality of linking devices to the external system.

20 Claims, 9 Drawing Sheets

(56) References Cited

U.S. PATENT DOCUMENTS

| | | | |
|---|---|---|---|
| 7,660,915 B2 | 2/2010 | Apel et al. | |
| 7,730,190 B2 * | 6/2010 | Coile et al. | 709/227 |
| 7,872,971 B2 | 1/2011 | Fujisawa et al. | |
| 7,965,664 B2 | 6/2011 | Hodson et al. | |
| 7,987,305 B2 | 7/2011 | Blair et al. | |
| 8,031,727 B2 | 10/2011 | Ishii | |
| 8,050,875 B2 | 11/2011 | Karschnia | |
| 8,051,220 B2 | 11/2011 | Apel et al. | |
| 8,065,460 B2 | 11/2011 | Wei et al. | |
| 8,090,452 B2 | 1/2012 | Johnson et al. | |
| 8,132,035 B2 | 3/2012 | Juillerat et al. | |
| 8,144,028 B2 | 3/2012 | LaMothe et al. | |
| 8,200,783 B2 | 6/2012 | Eryurek et al. | |
| 8,203,980 B2 | 6/2012 | Sichner et al. | |
| 8,205,022 B2 | 6/2012 | Isenmann et al. | |
| 8,219,216 B2 | 7/2012 | Klug et al. | |
| 8,225,271 B2 | 7/2012 | Eldridge et al. | |
| 8,250,279 B2 | 8/2012 | Grgic et al. | |
| 8,266,256 B2 | 9/2012 | Eldering | |
| 8,306,658 B2 | 11/2012 | Kilian | |
| 8,335,854 B2 | 12/2012 | Eldering | |
| 2002/0083364 A1 * | 6/2002 | Christensen et al. | 714/13 |
| 2002/0184410 A1 | 12/2002 | Apel et al. | |
| 2004/0030766 A1 | 2/2004 | Witkowski | |
| 2006/0020678 A1 | 1/2006 | Kessler et al. | |
| 2007/0038700 A1 | 2/2007 | Eryurek et al. | |
| 2007/0129820 A1 | 6/2007 | Glanzer et al. | |
| 2007/0140237 A1 | 6/2007 | Gustin et al. | |
| 2007/0143393 A1 | 6/2007 | Brunswig et al. | |
| 2007/0161367 A1 * | 7/2007 | Dobrowski et al. | 455/412.1 |
| 2007/0244584 A1 | 10/2007 | John et al. | |
| 2007/0250180 A1 | 10/2007 | Bump et al. | |
| 2007/0280286 A1 | 12/2007 | Hodson et al. | |
| 2008/0005550 A1 | 1/2008 | Ichtertz | |
| 2008/0080521 A1 | 4/2008 | Sichner et al. | |
| 2008/0126659 A1 | 5/2008 | Klofer et al. | |
| 2008/0162738 A1 | 7/2008 | Apel et al. | |
| 2008/0163006 A1 | 7/2008 | Apel et al. | |
| 2008/0267101 A1 | 10/2008 | Webb et al. | |
| 2008/0273486 A1 | 11/2008 | Pratt et al. | |
| 2008/0294915 A1 | 11/2008 | Juillerat et al. | |
| 2008/0313254 A1 * | 12/2008 | Hilemon et al. | 709/200 |
| 2008/0320137 A1 | 12/2008 | Ito et al. | |
| 2009/0010233 A1 * | 1/2009 | Pratt et al. | 370/338 |
| 2009/0018672 A1 | 1/2009 | Gienke | |
| 2009/0157925 A1 | 6/2009 | Schwalbe et al. | |
| 2009/0175284 A1 | 7/2009 | Fujisawa et al. | |
| 2009/0204958 A1 | 8/2009 | Kornmeier | |
| 2009/0210077 A1 | 8/2009 | Lefebvre | |
| 2009/0232021 A1 * | 9/2009 | Bachmutsky | 370/254 |
| 2009/0234465 A1 | 9/2009 | Karsten | |
| 2009/0265020 A1 | 10/2009 | Blair et al. | |
| 2009/0326852 A1 | 12/2009 | Vetter et al. | |
| 2010/0100773 A1 | 4/2010 | Apel et al. | |
| 2010/0261044 A1 | 10/2010 | Thoren et al. | |
| 2010/0262264 A1 | 10/2010 | Hahniche et al. | |
| 2010/0263025 A1 | 10/2010 | Neitzel et al. | |
| 2010/0274942 A1 | 10/2010 | Grgic et al. | |
| 2010/0287277 A1 | 11/2010 | De Groot et al. | |
| 2011/0246630 A1 | 10/2011 | Deutsch et al. | |
| 2012/0004743 A1 | 1/2012 | Anne et al. | |
| 2012/0017122 A1 * | 1/2012 | Apel et al. | 714/43 |
| 2012/0102240 A1 | 4/2012 | Wei et al. | |
| 2012/0253477 A1 | 10/2012 | Hodson | |

FOREIGN PATENT DOCUMENTS

| | | |
|---|---|---|
| GB | 2395803 | 6/2004 |
| JP | 2005044111 | 2/2005 |
| JP | 2010140302 | 6/2010 |
| WO | 2004042674 A1 | 5/2004 |
| WO | 2007121218 A2 | 10/2007 |

OTHER PUBLICATIONS

Osztermayer, J. et al. "Enhanced Competitiveness with a Modern Asset Management System," IEEE International Symposiumon Modern Electric Power Systems, 2002.

Chen, Peter et al. "Systems Quality Requirements Engineering (SQUARE) Methodology: Case Study on Asset ManagementSystem," OTIC Online: Information for the Defense Community, Dec. 2004, pp. 1-326.

Santori, M. and Zech, K. "Fieldbus Brings Protocol to Process Control," IEEE Spectrum, vol. 33, Issue 3, Mar. 1996, pp. 60-64.

Hoon, Pee Suat and Huan, Yang Rong. "Foundation Fieldbus High Speed Ethernet (HSE) Implementation," Proceedings of theIEEE International Symposium on Intelligent Control, 2002, pp. 777-782.

Kolla, S. et al. "Fieldbus Networks for Control System Implementations," Proceedings of the Electrical Insulation Conferenceand Electrical Manufacturing and Coil Winding Technology Conference, Sep. 25, 2003, pp. 493-498.

Non-Final Office Action for U.S. Appl. No. 13/159,163 mailed Nov. 28, 2012.

Non-Final Office Action for U.S. Appl. No. 13/159,130 mailed Jan. 3, 2013.

Non-Final Office Action for U.S. Appl. No. 13/159,142 mailed Mar. 14, 2013.

Non-Final Office Action for U.S. Appl. No. 13/159,152 mailed Mar. 28, 2013.

Non-Final Office Action for U.S. Appl. No. 13/159,163 mailed Jun. 6, 2013.

Final Office Action for U.S. Appl. No. 13/159,142 mailed Jul. 3, 2013.

Final Office Action for U.S. Appl. No. 13/159,159 mailed Jun. 26, 2013.

Final Office Action for U.S. Appl. No. 13/159,130 mailed Jul. 24, 2013.

Non-Final Office Action for U.S. Appl. No. 13/159,159 mailed Oct. 22, 2013.

Non-Final Office Action for U.S. Appl. No. 13/159,142 mailed Nov. 22, 2013.

Notice of Allowance for U.S. Appl. No. 13/159,130 mailed Jan. 30, 2014.

Notice of Allowance for U.S. Appl. No. 13/159,163 mailed Jan. 13, 2014.

Notice of Allowance for U.S. Appl. No. 13/159,159 mailed Jan. 29, 2014.

* cited by examiner

SYSTEMS AND METHODS FOR FACILITATING COMMUNICATION WITH FOUNDATION FIELDBUS LINKING DEVICES

CROSS-REFERENCE TO RELATED APPLICATIONS

This application claims benefit of U.S. Provisional Application No. 61/491,625, filed May 31, 2011 and entitled "Systems and Methods for Identifying Foundation Fieldbus Linking Devices," the disclosure of which is incorporated by reference herein in its entirety. Additionally, this application is related to co-pending patent application Ser. No. 13/159,163, filed Jun. 13, 2011, and entitled "Systems and Methods for Identifying Foundation Fieldbus Linking Devices"; co-pending patent application Ser. No. 13/159,159, filed Jun. 13, 2011, and entitled "Systems and Methods for Facilitating Communication with Foundation Fieldbus Linking Devices"; co-pending patent application Ser. No. 13/159,130, filed Jun. 13, 2011, and entitled "Systems and Methods for Facilitating Communication with Foundation Fieldbus Linking Devices"; and co-pending patent application Ser. No. 13/159,142, filed Jun. 13, 2011, and entitled "Systems and Methods for Write Protecting Foundation Fieldbus Linking Devices."

FIELD OF THE INVENTION

Embodiments of the invention relate generally to control systems and more specifically to the identification of Foundation Fieldbus linking devices utilized in association with control systems and the facilitation of communications with the Foundation Fieldbus linking devices.

BACKGROUND OF THE INVENTION

Control systems are utilized in a wide variety of different applications. For example, control systems are utilized in conjunction with power generating devices, in power plants, and/or in process plants. With the development and adoption of the Foundation Fieldbus standard, Foundation Fieldbus devices have been incorporated into control systems. In typical systems, controllers communicate with Foundation Fieldbus linking devices utilizing Ethernet networks, and the linking devices communicate with Fieldbus devices utilizing local data buses or linking segments.

Additionally, asset management systems ("AMSs") are often utilized to identify and/or manage components of a control system. For example, an AMS may be utilized to monitor a topology of Foundation Fieldbus devices. However, conventional AMSs are limited in their ability to communicate with Foundation Fieldbus linking devices. More specifically, conventional AMSs can typically only communicate directly with Foundation Fieldbus linking devices via a single Fieldbus Ethernet network. Additionally, conventional AMSs are often only capable of communicating with a limited number of Foundation Fieldbus linking devices. For example, a typical AMS may only be capable of communicating with up to eight linking devices. Given the limitations of conventional AMSs, improved systems and methods for identifying Foundation Fieldbus linking devices and/or facilitating communications with Foundation Fieldbus linking devices are desirable.

BRIEF DESCRIPTION OF THE INVENTION

Some or all of the above needs and/or problems may be addressed by certain embodiments of the invention. Embodiments of the invention may include systems and methods for facilitating communication with Foundation Fieldbus linking devices. According to one embodiment of the invention, there is disclosed a method for facilitating communication with Foundation Fieldbus linking devices. A plurality of Foundation Fieldbus linking devices may be identified by a gateway device that includes one or more computers. A single virtual address representative of the plurality of linking devices may be determined by the gateway device. Communications between the plurality of linking devices and an external system may be facilitated by the gateway device, and the virtual address may be utilized to represent the plurality of linking devices to the external system.

According to another embodiment of the invention, there is disclosed a system for facilitating communication with Foundation Fieldbus linking devices. The system may include at least one memory and at least one processor. The at least one memory may be configured to store computer-executable instructions. The at least one processor may be configured to access the at least one memory and execute the computer-executable instructions to: identify a plurality of Foundation Fieldbus linking devices; determine a single virtual address representative of the plurality of linking devices; and facilitate communications between the plurality of linking devices and an external system, wherein the virtual address is utilized to represent the plurality of linking devices to the external system.

According to one embodiment of the invention, there is disclosed a method for facilitating communication with Foundation Fieldbus linking devices. A plurality of Foundation Fieldbus linking devices may be identified by a gateway device that includes one or more computers. A single virtual address representative of the plurality of linking devices may be determined by the gateway device. Information associated with operation of at least one of the plurality of linking devices may be provided by the gateway device to an external system. The virtual address may be utilized to represent the at least one linking device to the external system.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
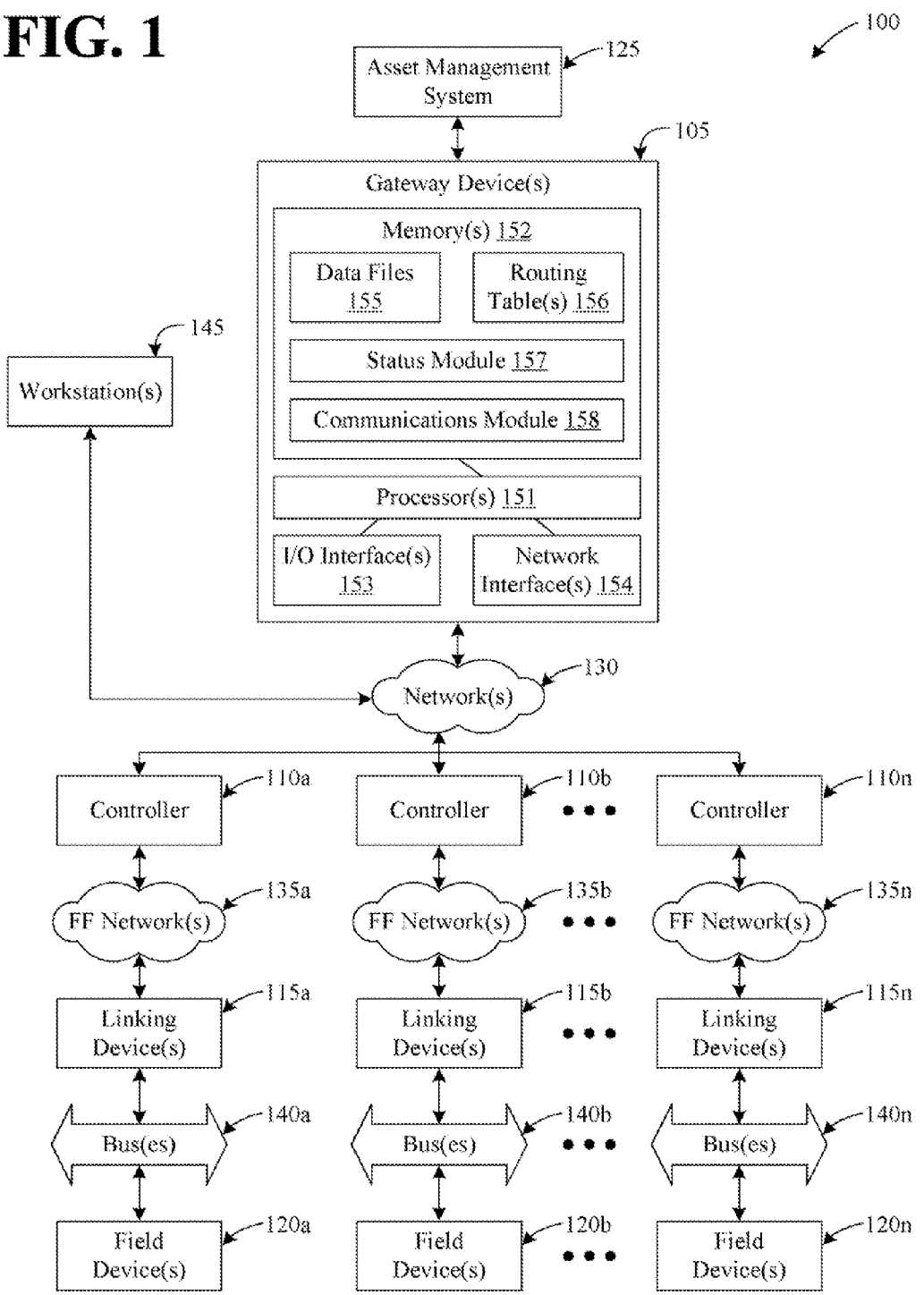

Having thus described the invention in general terms, reference will now be made to the accompanying drawings, which are not necessarily drawn to scale, and wherein:

FIG. 1 is a schematic block diagram of one example system that may be utilized to facilitate the identification of Foundation Fieldbus linking devices and/or communication with Foundation Fieldbus linking devices, according to an illustrative embodiment of the invention.

Figure 2A:
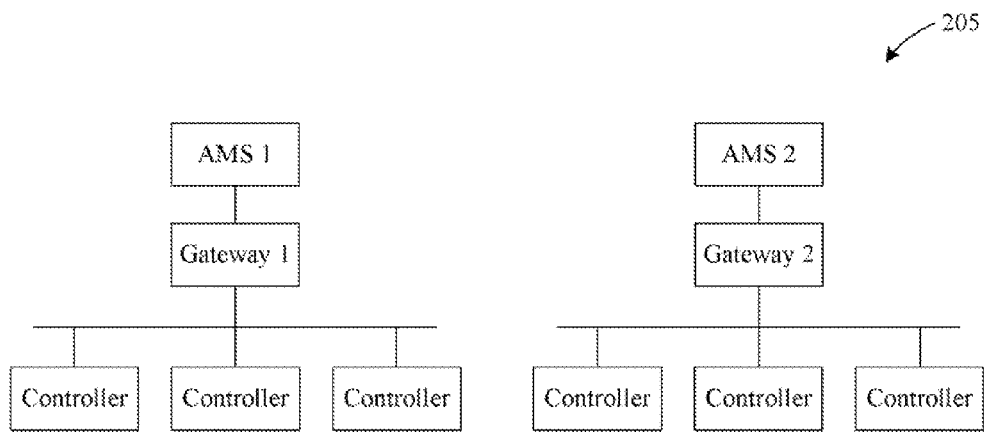
Figure 2B:
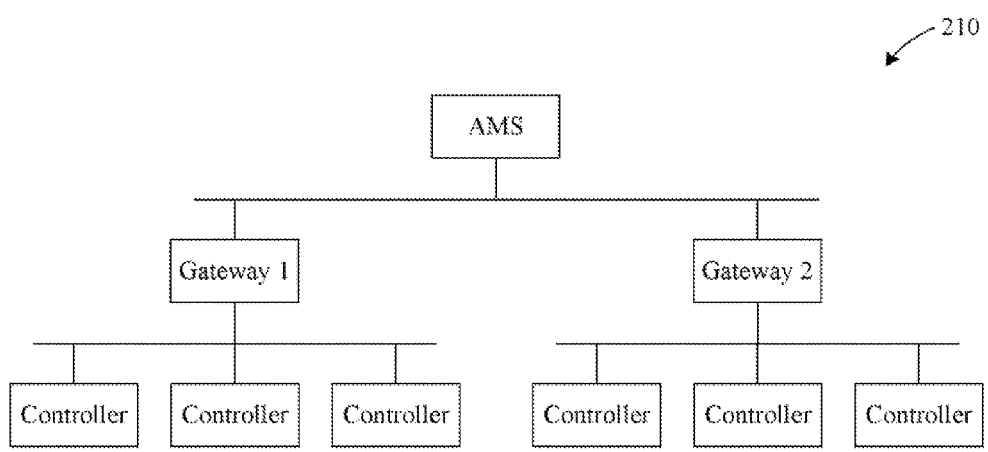
Figure 2C:
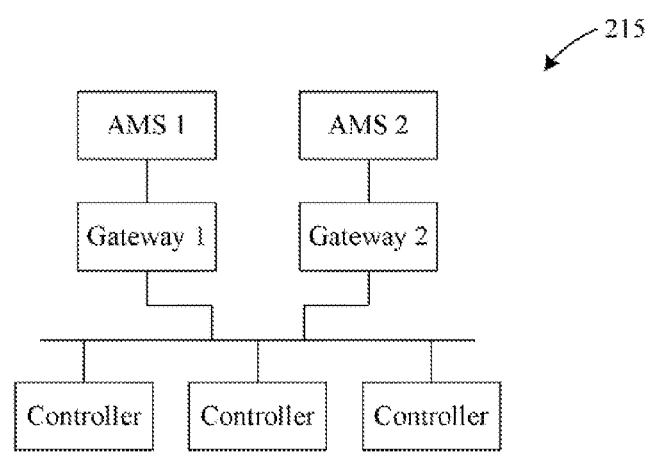

FIGS. 2A-2C are schematic block diagrams of example system topologies that may be utilized in accordance with various embodiments of the invention.

Figure 3:
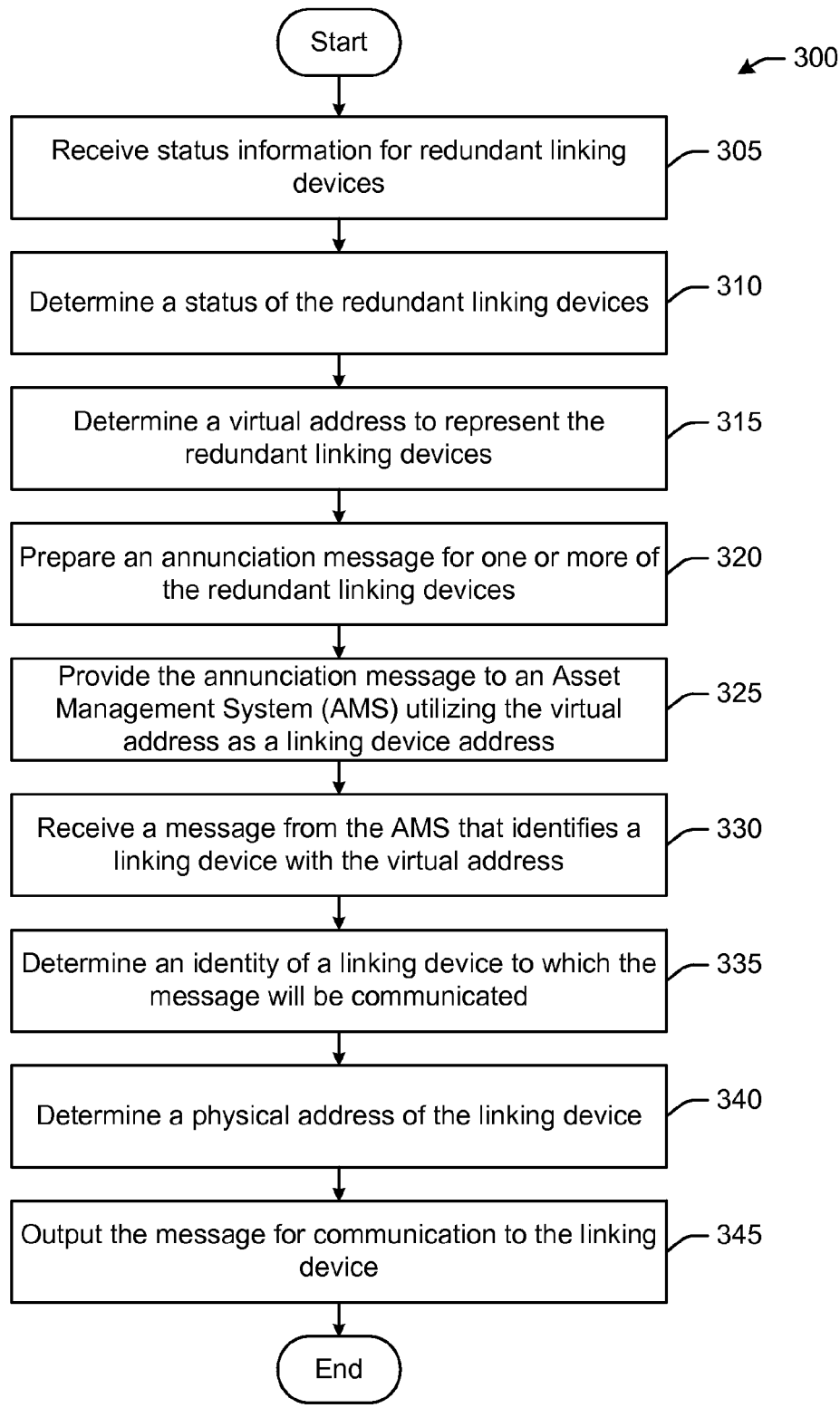

FIG. 3 is a flow diagram of an example method for identifying redundant linking devices and facilitating communication with redundant linking devices, according to an illustrative embodiment of the invention.

Figure 4:
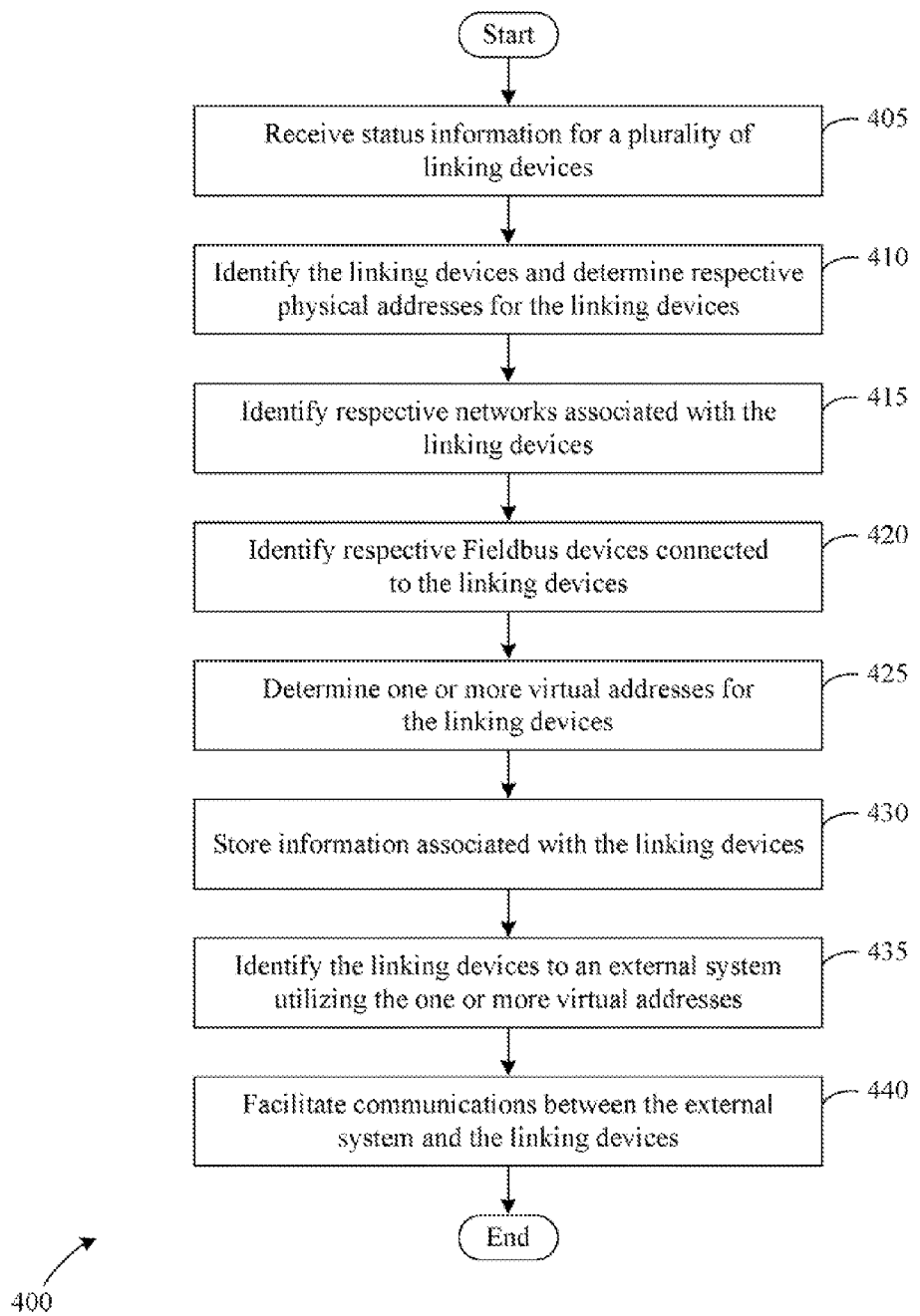

FIG. 4 is a flow diagram of an example method for identifying a plurality of linking devices and facilitating communication with the plurality of linking devices, according to an illustrative embodiment of the invention.

Figure 5:
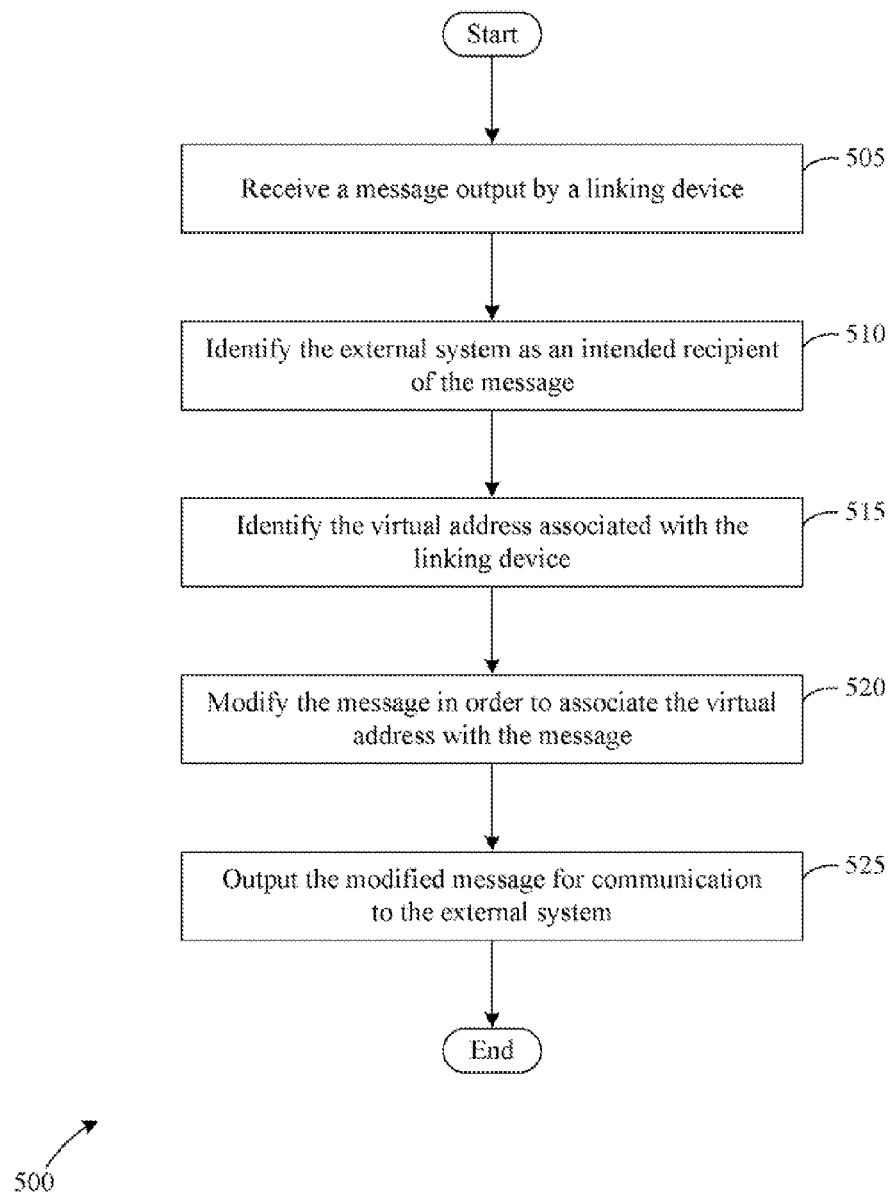

FIG. 5 is a flow diagram of an example method for routing messages from a linking device to an external system, according to an illustrative embodiment of the invention.

Figure 6:
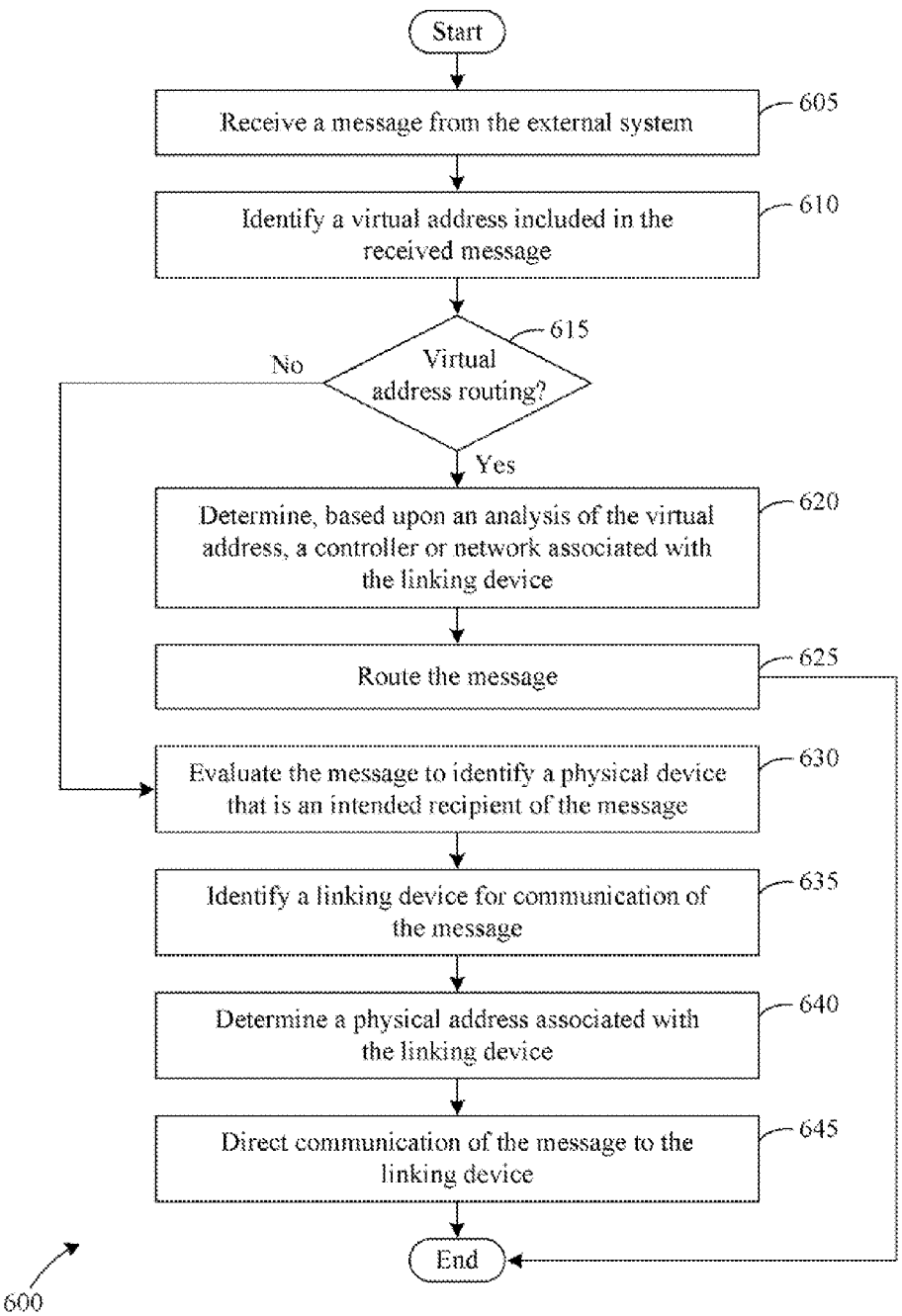

FIG. 6 is a flow diagram of an example method for routing messages from an external system to a linking device, according to an illustrative embodiment of the invention.

Figure 7:
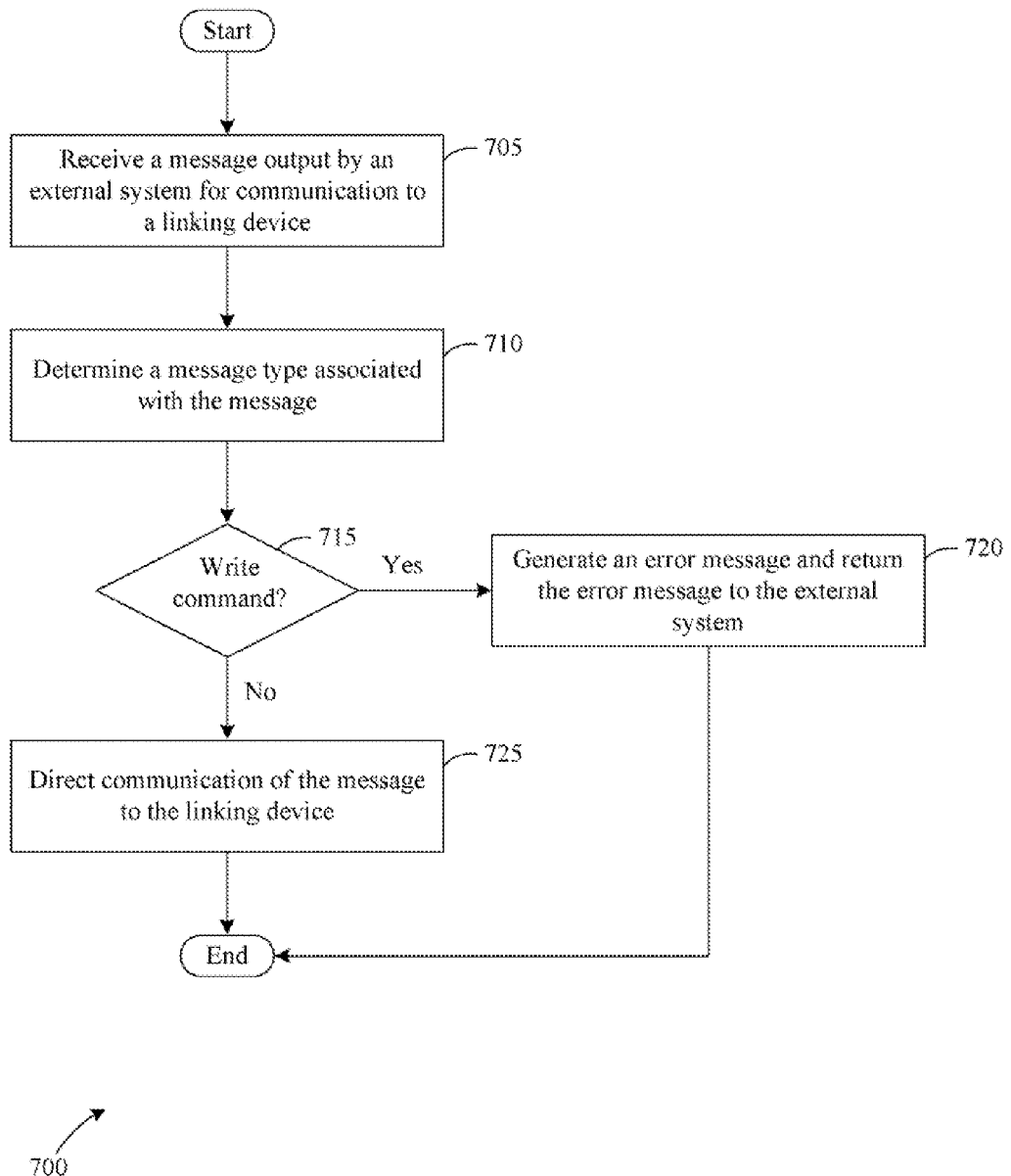

FIG. 7 is a flow diagram of an example method for providing write protection for Foundation Fieldbus linking devices and Foundation Fieldbus devices, according to an illustrative embodiment of the invention.

Figure 8:
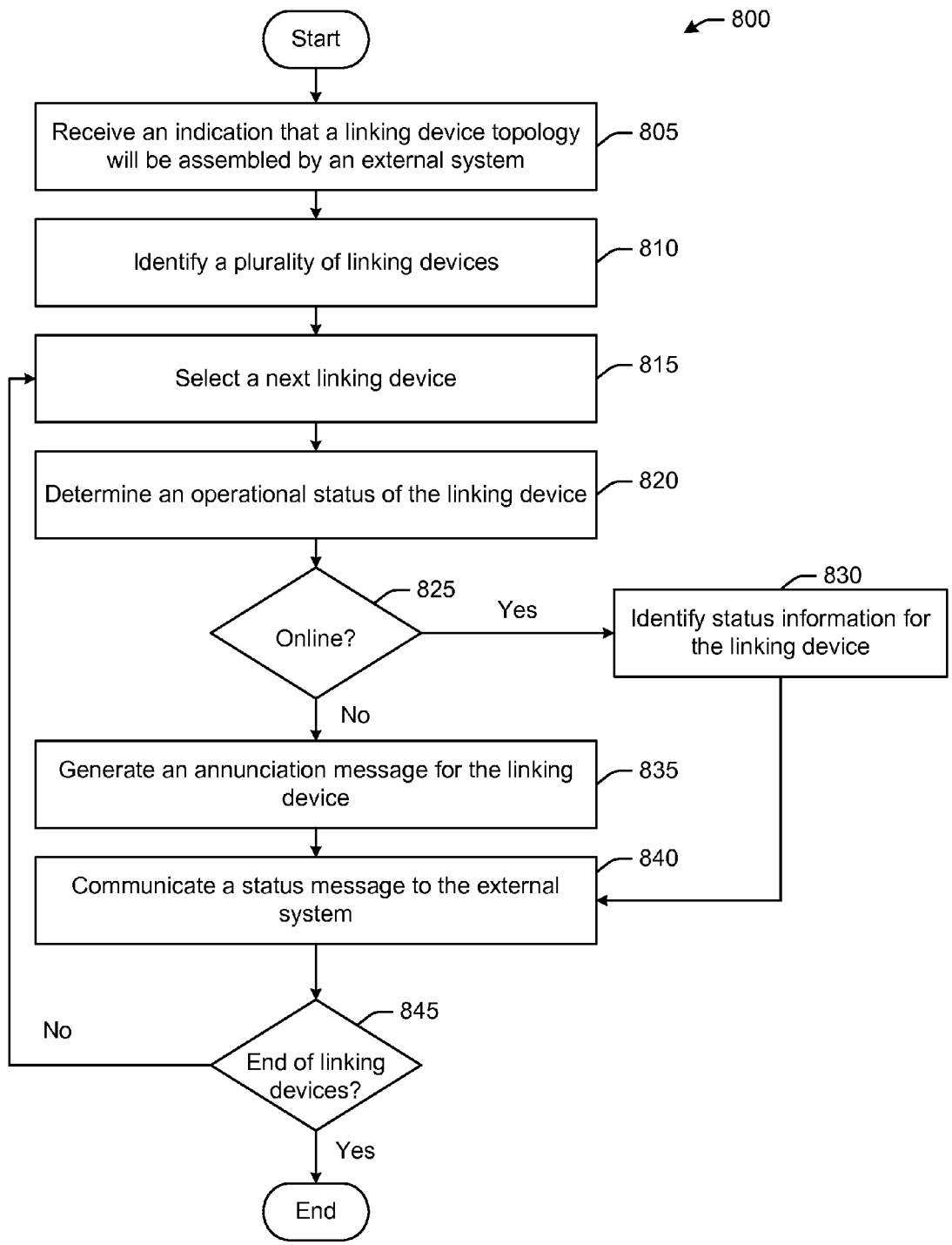

FIG. 8 is a flow diagram of an example method for identifying both online and offline linking devices, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein, rather, these embodiments are provided so that this disclosure will satisfy applicable legal requirements. Like numbers refer to like elements throughout.

Disclosed are systems and methods for facilitating the identification of Foundation Fieldbus linking devices and/or communication with Foundation Fieldbus linking devices. More specifically, gateway devices and methods of example operations of the gateway devices are disclosed. In one example embodiment, a gateway device may be configured to collect information from any number of Foundation Fieldbus linking devices and/or controllers associated with the Foundation Fieldbus linking devices. In this regard, the gateway device may be configured to provide identification information for the Foundation Fieldbus linking devices to one or more external systems, such as an asset management system ("AMS"). Additionally, the gateway device may be configured to facilitate communications between an external system and the Foundation Fieldbus linking devices.

According to an aspect of the invention, the gateway device may utilize one or more virtual addresses to identify linking devices to an external system and/or to facilitate communications between the external system and the linking devices. As desired, a single virtual address may be utilized to represent a plurality of linking devices. For example, a single virtual address may be utilized to represent a plurality of linking devices associated with different controllers, different Fieldbus networks, and/or different Foundation Fieldbus devices. As another example, a single virtual address may be utilized to represent a plurality of redundant linking devices. In certain embodiments, the gateway device may add virtual addresses for linking devices to communications that are transmitted to the external system. Similarly, the gateway device may identify physical linking device addresses that facilitate the routing of communications received from the external system to the linking devices. As a result of utilizing virtual addresses, the communication capabilities of external systems, such as AMSs, may be enhanced. For example, an AMS may be permitted to communicate with a greater number of linking devices and/or with redundant linking devices. As another example, an AMS may be permitted to communicate with linking devices over a plurality of Fieldbus networks.

In one example embodiment of the invention, a gateway device may identify a plurality of linking devices. For example, the gateway device may receive linking device status information from one or more controllers that manage linking devices. As another example, the gateway device may receive annunciation messages output by linking devices. Once a plurality of linking devices have been identified, the gateway device may determine one or more virtual addresses representative of the linking devices. As mentioned above, a single virtual address may be utilized to represent two or more linking devices. The virtual addresses may then be utilized to facilitate identification of the linking devices to an AMS or other external system. For example, one or more annunciation messages that identify the linking devices by their virtual addresses may be communicated to an AMS to facilitate linking device identification. As desired, an annunciation message may be generated by the gateway device. Alternatively, an annunciation message may be received by the gateway device and modified to include a virtual address.

Additionally, the gateway device may facilitate the routing of communications between linking devices and the AMS. When a message is received from a linking device or controller, the gateway device may determine an appropriate virtual address for the linking device. The gateway device may then modify the received message in order to associate the virtual address with the message. The modified message may then be communicated to the AMS or another external system, and the virtual address may be utilized by the AMS to identify the linking device.

When a message is received from an AMS or other external system for communication to a linking device or a Foundation Fieldbus device connected to a linking device, the gateway device may process the virtual address to facilitate the routing of the message to an appropriate linking device or linking device controller. In certain embodiments, the message may be routed utilizing the virtual address. For example, a portion of the virtual address may be utilized to identify a next destination for the message, such as a controller associated with a destination linking device. The message may then be routed to the next destination by the gateway device. In other embodiments, the gateway device may evaluate the virtual address and/or the message in order to identify a physical address for a linking device that is an intended recipient of the message or that controls a Foundation Fieldbus device that is an intended recipient of the message. For example, the gateway device may access one or more routing tables utilizing the virtual address in order to identify a physical address for a linking device. In the event that multiple linking devices are associated with the physical address, the gateway device may evaluate the message in order to identify an appropriate linking device. For example, a device identifier included in the message, such as an identifier of a Foundation Fieldbus device, may be utilized to determine or select an appropriate linking device. The message may then be output for communication to the appropriate linking device.

In certain embodiments, the gateway device may additionally provide write protection for Foundation Fieldbus linking devices and/or Foundation Fieldbus devices. For example, a determination may be made that an AMS or other external system will be permitted to collect information associated with linking devices and Foundation Fieldbus devices; however, the AMS will not be permitted to configure or otherwise write data to the linking devices and Foundation Fieldbus devices. In one example embodiment, the gateway device may receive a message from an AMS or other external system, and the gateway device may evaluate the message in order to identify a message type or command type associated with the message. For example, a header of the message may be evaluated in order to determine whether the message includes a command for a write operation. In the event that the message is associated with a write operation, the gateway device may trigger or generate an exception that prevents the requested write operation. As desired, the gateway device may generate an error or exception message that is returned to the external system. In the event that the message is not associated with the write operation (i.e., the message includes a requested read operation), then the gateway device may output the message for communication to the appropriate linking device.

Additionally, in certain embodiments, the gateway device may assist an AMS or other external system in the collection of linking device topology information. More specifically, the gateway device may facilitate the identification of linking devices by an external system even if the linking devices are in an "offline" state (e.g., not connected to the network, not operating properly, etc.). In this regard, the external system may recognize linking devices that are not actively outputting operational information (e.g., annunciation messages, etc.) that is communicated to the external system. In one example embodiment, the gateway device may identify linking devices, such as linking devices that are connected to one or more controllers. For example, the gateway device may evaluate status information received from the controllers and/or linking devices in order to identify linking devices. As desired, the gateway device may store information associated with identified linking devices. Additionally, the gateway device may determine an operational status associated with a linking device. For example, the gateway device may determine whether the linking device is "online" or "offline." In the event that the linking device is "offline," the gateway device may generate an annunciation message for the linking device, and the generated annunciation message may be communicated to the external system. As desired, a virtual address may be utilized to represent the linking device. As a result of the gateway device generating and communicating an annunciation message, the external system may identify the linking device during the generation of a control system or linking device topology.

Various embodiments of the invention may include one or more special purpose computers, systems, and/or particular machines that facilitate the identification of Foundation Fieldbus linking devices and/or communication with the Foundation Fieldbus linking devices. A special purpose computer or particular machine may include a wide variety of different software modules as desired in various embodiments. As explained in greater detail below, in certain embodiments, these various software components may be utilized to associate virtual addresses with linking devices and utilize the virtual addresses to facilitate identification of the linking devices and/or communication with the linking devices. Additionally, in certain embodiments, these software components may be utilized to facilitate write protection of the linking devices.

Certain embodiments of the invention described herein may have the technical effect of facilitating the identification of Foundation Fieldbus linking devices to an external system, such as an asset management system. Additionally, certain embodiments of the invention may have the technical effect of facilitating communications between an external system and any number of Foundation Fieldbus linking devices. According to an aspect of the invention, virtual addresses may be utilized to identify the Foundation Fieldbus linking devices to the external system. In this regard, communication limitations of external systems may be overcome. For example, an AMS may be permitted to communicate with any number of Foundation Fieldbus linking devices. As another example, an AMS may be permitted to communicate over any number of Fieldbus networks. Further, certain embodiments of the invention may have the technical effect of providing write protection for Foundation Fieldbus linking devices.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet ("HSE") devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a controller and/or a gateway device associated with the control system. Additionally, the term HSE protocol may be utilized to refer to a Fieldbus protocol that facilitates communications with HSE Fieldbus devices.

Communications between Fieldbus devices and/or between one or more controllers and/or gateway devices and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

FIG. 1 is a block diagram of one example system 100 that may be utilized to facilitate the identification of Fieldbus linking devices and/or communication with Fieldbus linking devices, according to an illustrative embodiment of the invention. The system 100 may include one or more gateway devices 105, one or more controllers 110a-n or control devices, one or more linking devices 115a-n, one or more Fieldbus devices 120a-n, and/or one or more external systems 125 (e.g., an asset management system, etc.). In certain embodiments, a gateway device 105 may communicate with one or more controllers 110a-n via any number of suitable networks 130, and each controller 110a-n may communicate with Fieldbus linking devices 115a-n via one or more Fieldbus networks 135a-n, such as one or more Fieldbus higher speed Ethernet ("HSE") networks. In other embodiments, a gateway device 105 may communicate directly with Fieldbus linking devices 115a-n via the Fieldbus networks 135a-n. Additionally, the linking devices 115a-n may communicate with the various Fieldbus devices 120a-n via one or more suitable buses 140a-n or local networks.

As desired in various embodiments of the invention, any number of controllers 110a-n or control systems may be provided. Each controller 110a-n may be configured to communicate with various components of a control system and/or a device, plant, or system that is controlled by the control system. One example of a suitable controller is a Mark™ Vie control system produced by the General Electric Company. Each controller (generically referred to as controller 110) may be configured to receive data associated with the operation of one or more connected linking devices 115a-n and/or Fieldbus devices 120a-n associated with the linking devices 115a-n. The controller 110 may additionally process at least a portion of the received data and/or output one or more control signals or other messages for receipt by any number of linking devices 115a-n and/or Fieldbus devices 120a-n.

Additionally, in certain embodiments, a controller 110 may be configured to provide information associated with the connected linking devices 115a-n to a gateway device 105. For example, annunciation messages received by the controller 110 and/or generated by the controller 110 may be communicated to the gateway device 105. Additionally, the controller 110 may be configured to forward certain communications received from the linking devices 115a-n to the gateway device 105 and/or to any number of workstations 145, such as workstations that facilitate the receipt of technician or other user input by the controller 110. In a similar manner, the controller 110 may be configured to forward certain communications received from the gateway device 105 and/or workstations 145 to the connected linking devices 115a-n.

Each controller 110 may include any number of processor-driven devices. For example, each controller 110 may include any number of special purpose computers or particular machines, application-specific circuits, programmable logic controllers ("PLC"), microcontrollers, personal computers, minicomputers, mainframe computers, supercomputers, and the like. In certain embodiments, the operations of the controller 110 may be controlled by computer-executed or computer-implemented instructions that are executed by one or more processors associated with the controller 110. The instructions may be embodied in one or more software components as desired in various embodiments of the invention. The execution of the instructions may form a special purpose computer or other particular machine that is operable to facilitate control of the Fieldbus linking devices 115a-n and/or Fieldbus devices 120a-n and/or communication with the gateway device 105.

As shown in FIG. 1, each controller 110 may be in communication with respective linking devices and Fieldbus devices via one or more suitable networks. For example, a first controller 110a may be in communication with first linking devices 115a via one or more first Fieldbus networks 135a, a second controller 110b may be in communication with second linking devices 115b via one or more second Fieldbus networks 135b, and so on. In other embodiments, multiple controllers may be in communication with shared linking devices and/or Fieldbus devices. Indeed, a wide variety of network topologies may be utilized as desired.

With continued reference to FIG. 1, any number of linking devices 115a-n may be utilized in association with the system 100. The linking devices 115a-n may be devices that are capable of communicating via a local Fieldbus network or bus (e.g., buses 140a-n, etc.) and via one or more relatively higher speed Fieldbus networks (e.g., networks 135a-n) that facilitate communications with a controller 110 and/or a gateway device 105. For example, a linking device (generically referred to as linking device 115) may be an HSE Fieldbus device or a combination HSE/H1 device. As such, the linking device 115 may be capable of communicating with a controller 110 via a suitable HSE Ethernet network (e.g., networks 135a-n, etc.) or other suitable network. Additionally, the linking device 115 may be capable of communicating with connected Fieldbus devices, such as Fieldbus devices 120a-n, via one or more local Fieldbus networks and/or data buses (e.g., buses 140a-n). As desired, the linking devices 115a-n may facilitate communication between the controllers 110a-n and the Fieldbus devices 120a-n. Alternatively, as desired in other embodiments, one or more of the Fieldbus devices 120a-n may be in direct communication with suitable controllers 110a-n.

A linking device 115 may include any number of segments and/or connections to which a Fieldbus data bus (generally referred to as bus 140) or local Fieldbus network may be connected. For example, in certain embodiments, a linking device 115 may include four (4) segments, although any other number of segments may be included as desired. Each segment may establish a separate communications channel and be configured to facilitate communications between the linking device 115 and the Fieldbus devices connected to the segment. As desired, two or more redundant linking devices may be provided to facilitate communications with a group or set of one or more Fieldbus devices.

In certain embodiments, a linking device 115 may be configured to transmit or communicate a message including status and/or timing information to a suitable controller 110 or gateway device 105. For example, an annunciation message may be periodically output by the linking device 115. The period for the communications may be a default time period or a period that is established by one or more user preferences. Additionally, a wide variety of suitable time periods may be utilized as desired, such as a period of approximately five hundred (500) milliseconds. In other embodiments, a message (e.g., an annunciation message, etc.) may be communicated to a controller 110 (or gateway device 105) in response to a request for the message. As desired, a communicated message may include a wide variety of different information, such as identification information, status information, and/or timing information associated with the segments of the linking devices 115 and/or the Fieldbus devices 120 connected to the various segments.

With continued reference to FIG. 1, any number of Fieldbus devices 120a-n may be utilized in association with the system 100. In certain embodiments, each Fieldbus device (generally referred to as device 120) may be in communication with a linking device 115 via a local Fieldbus network or data bus, such as data buses 140a-n. In this regard, communications between the Fieldbus device 120 and other components of the system 100, such as the controller 110 and/or the gateway device 105, may be facilitated by the linking device 115. In other embodiments, a Fieldbus device 120 may be in direct communication with a controller 110 or other component of the system 100. A wide variety of different types of Fieldbus devices may be utilized as desired in various embodiments of the invention, including any number of H1 Fieldbus devices and/or other suitable devices. In certain embodiments, the Fieldbus devices 120a-n may be distributed or situated at varying points within a power plant, within a process plant, or about a monitored system or machine. In this regard, the Fieldbus devices 120a-n may be utilized to monitor and/or control various aspects and/or operations of a plant or machine.

With continued reference to FIG. 1, the one or more illustrated Fieldbus networks 135a-n may include any suitable network or combination of networks that facilitate communications between the linking devices 115a-n and the controllers 110a-n. Similarly, the Fieldbus data buses 140a-n or networks may include any number of suitable data buses and/or local area networks that facilitate communication between a linking device 115 and Fieldbus devices that are connected to the linking device 115. Examples of suitable networks and/or data buses include, but are not limited to, a local area network, a wide area network, the Internet, a radio frequency ("RF") network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within a network. Each of the Ethernet switches may include hardware and/or software components that are operable to facilitate the routing of data within the network. Examples of suitable Ethernet switches include, but are not limited to, network bridges, multilayer switches, etc.

As desired in various embodiments of the invention, redundant components may be provided within the system 100. For example, redundant wiring, switches, and/or routers may be provided. Additionally, in certain embodiments, redundant linking devices 115a-n and/or segments may be provided. In this regard, adequate operations may be maintained within the system 100 in the event of failure of a network device.

With continued reference to FIG. 1, one or more gateway devices 105 may be provided. A gateway device 105 may be configured to create and/or facilitate a virtual network between the linking devices 115a-n and/or controllers 110a-n and any number of external systems, such as an asset management system ("AMS") 125. In doing so, the gateway device 105 may identify linking devices 115a-n to an external system by utilizing one or more virtual addresses. Additionally, the gateway device 105 may facilitate communications between linking devices 115a-n and the external system. As a result, the communication capabilities of the external systems may be expanded. For example, the use of virtual addresses may make it possible for an AMS to communicate with any number of Fieldbus linking devices and/or to communicate with linking devices via any number of separate Fieldbus networks.

The gateway device 105 may include any number of suitable processor-driven devices. For example, the gateway device 105 may include any number of special purpose computers or particular machines, application-specific circuits, programmable logic controllers ("PLC"), microcontrollers, personal computers, minicomputers, mainframe computers, supercomputers, and the like. In certain embodiments, the operations of the gateway device 105 may be controlled by computer-executed or computer-implemented instructions that are executed by one or more processors associated with the gateway device 105. The instructions may be embodied in one or more software components as desired in various embodiments of the invention. The execution of the instructions may form a special purpose computer or other particular machine that is operable to control the operations of the gateway device 105 and/or to facilitate the establishment of a virtual network between an external system and any number of Fieldbus linking devices 115a-n. The one or more processors that control the operations of the gateway device 105 may be incorporated into the gateway device 105, and/or in communication with the gateway device 105 via one or more suitable networks. In certain embodiments of the invention, the operations and/or control of the gateway device 105 may be distributed among several processing components.

The gateway device 105 may include one or more processors 151, one or more memory devices 152, one or more input/output ("I/O") interfaces 153, and/or one or more network interfaces 154. The one or more memory devices 152 may be any suitable memory devices, for example, caches, read-only memory devices, random access memory devices, magnetic storage devices, etc. The one or more memory devices 152 may store data, executable instructions, and/or various program modules utilized by the gateway device 105, for example, data files 155, one or more routing tables 156, an operating system, a status module 157, and/or a communications module 158. Additionally, as desired, the memory devices 152 may be operable to store any number of suitable protocols that facilitate communications, such as a Fieldbus or HSE protocol and/or other protocols that facilitate communication with non-Fieldbus components, such as the AMS 125.

The data files 155 may include any suitable data associated with the operation of the gateway device 105 and/or communication with other components of the system 100. For example, the data files 155 may include, but are not limited to, identification information for one or more controllers 110a-n, identification information for one or more external systems, identification information for one or more Fieldbus networks 135a-n, identification information for one or more linking devices 115a-n, status information for one or more linking devices 115a-n, virtual addresses associated with linking devices 115a-n, physical addresses associated with linking devices 115a-n, identification information for one or more Fieldbus devices 120a-n, and/or status information for one or more Fieldbus devices 120a-n. The routing tables 156 may include any suitable routing information that may be utilized to route communications between the linking devices 115a-n, external system, and/or the controllers 110a-n. For example, the routing tables 156 may include information utilized to map physical addresses of linking devices into virtual addresses that are utilized to represent the linking devices to the external system. As another example, the routing tables 156 may include network routing information that facilitates the forwarding of received messages to appropriate controllers. For example, the routing tables 156 may include information that associates a portion of a virtual address (e.g., a first predetermined number of digits, etc.) with a particular controller or Fieldbus network to facilitate routing of messages to an appropriate controller for distribution to a Fieldbus linking device.

As desired, an operating system ("OS") may be provided. The OS may include executable instructions and/or program modules that facilitate and/or control the general operation of the gateway device 105. For example, the OS may facilitate the execution of other software programs and/or program modules by the processors 151, such as the status module 157 and/or the communications module 158. The status module 157 may be a suitable software module or application that is configured to identify and/or generate status information for any number of linking devices 115a-n. In operation, the status module 157 may receive identification information and/or operational information associated with the linking devices 115a-n. For example, the status module 157 may receive annunciation messages generated by one or more linking devices 115a-n. As another example, the status module 157 may receive information associated with the linking devices 115a-n from one or more controllers 110a-n.

Once the linking devices 115a-n have been identified, the status module 157 may determine one or more virtual addresses for the linking devices 115a-n. The virtual addresses may facilitate identification of the linking devices 115a-n to an AMS or other external system. A virtual address may be an address other than a physical device address that is utilized to represent one or more linking devices. In certain embodiments, a single virtual address may be utilized to represent a plurality of linking devices. For example, a single virtual address may be utilized to represent a plurality of redundant linking devices. As another example, a single virtual address may be utilized to represent a plurality of linking devices in communication with a single controller. As yet another example, a single virtual address may be utilized to represent a plurality of linking devices connected to a plurality of controllers and/or to a plurality of Fieldbus networks.

In certain embodiments of the invention, the status module 157 may additionally facilitate the communication of linking device identification information and/or status information to an AMS 125 or other external system. In this regard, the external system may identify linking devices for a wide variety of different purposes, such as asset identification purposes, asset control and/or management purposes, and/or communication purposes. A wide variety of suitable methods and/or techniques may be utilized by the status module 157 to communicate identification information to an external system. For example, annunciation messages received from the linking devices 115a-n and/or controllers 110a-n may be modified in order to associate virtual addresses with the annunciation messages, and the modified messages may be output for communication to the external system. As another example, annunciation messages may be generated by the status module 157, and the generated annunciation messages may be output for communication to the external system.

The communications module 158 may be a suitable software module or application that is configured to facilitate the routing of communications between an external system, such as the AMS 125, and any number of linking devices 115a-n and/or controllers 110a-n associated with the linking devices 115a-n. According to an aspect of the invention, the communications module 158 may utilize and/or evaluate virtual addresses to facilitate the routing of messages. When a message is received from a linking device 115 or controller 110, the message may include identifying information for a linking device 115 or Fieldbus device 120 associated with the linking device 115. For example, the message may include a physical address for the linking device 115 and/or a physical address for the Fieldbus device 120. The communications module 158 may determine an appropriate virtual address for the linking device 115. For example, the communications module 158 may utilize a physical address to access stored virtual address information in order to determine an appropriate virtual address for the linking device. The communications module 158 may then modify the received message in order to associate the virtual address with the message. The communications module 158 may then direct communication of the modified message to the external system, and the virtual address may be utilized by the external system to identify the linking device 115.

When a message is received from the external system for communication to a linking device 115 or Fieldbus device 120 connected to a linking device 115, the communications module 158 may process the virtual address to facilitate the routing of the message to an appropriate linking device 115 or linking device controller 110. In certain embodiments, the message may be routed utilizing the virtual address. For example, a portion of the virtual address may be utilized to identify a next destination for the message, such as a controller 110 associated with a destination linking device 115. The message may then be routed to the next destination by the communications module 158. In other embodiments, the communications module 158 may evaluate the virtual address and/or the message in order to identify a physical address for a linking device 115 that is an intended recipient of the message or that controls a Fieldbus device 120 that is an intended recipient of the message. For example, the communications module 158 may access one or more routing tables 156 utilizing the virtual address in order to identify a physical address for a linking device 115. In the event that multiple linking devices are associated with the physical address, the communications module 158 may evaluate the message in order to identify an appropriate linking device 115. For example, a device identifier included in the message, such as an identifier of a Fieldbus device 120, may be utilized to determine or select an appropriate linking device 115. The message may then be output for communication to the appropriate linking device 115.

In certain embodiments, the communications module 158 may additionally provide write protection for Fieldbus linking devices 115a-n and/or Fieldbus devices 120a-n. For example, a determination may be made that an external system will be permitted to collect information associated with linking devices 115a-n and Fieldbus devices 120a-n; however, the external system will not be permitted to configure or otherwise write data to the linking devices 115a-n and/or Fieldbus devices 120a-n. In one example embodiment, the communications module 158 may receive a message from an external system, and the communications module 158 may evaluate the message in order to identify a message type or command type associated with the message. For example, a header of the message may be evaluated in order to determine whether the message includes a command for a write operation. In the event that the message is associated with a write operation, the communications module 158 may trigger or generate an exception that prevents the requested write operation. As desired, the communications module 158 may generate an error or exception message that is returned to the external system. In the event that the message is not associated with the write operation (i.e., the message includes a requested read operation), then the communications module 158 may output the message for communication to the appropriate linking device 115.

As desired, the operations of the status module 157 and the communications module 158 may be performed by a single software module or application. Examples of the operations that may be performed by the status module 157 and/or the communications module 158 are described in greater detail below with reference to FIGS. 3-8.

With continued reference to FIG. 1, the one or more I/O interfaces 153 may facilitate communication between the gateway device 105 and one or more input/output devices, for example, one or more user interface devices, such as a display, keypad, mouse, pointing device, control panel, touch screen display, remote control, microphone, speaker, etc., that facilitate user interaction with the gateway device 105. In this regard, user commands may be received by the gateway device 105. The one or more network interfaces 154 may facilitate connection of the gateway device 105 to any number of suitable networks and/or transmission means. The network interfaces 154 may facilitate connection of the gateway device 105 to one or more networks 130 that facilitate communication with the controllers 110a-n and/or the workstations 145. Additionally, the network interfaces 154 may facilitate connection of the gateway device 105 to any number of external systems, such as the AMS 125. As desired, the network interfaces 154 may include any number of input/output cards (e.g., Ethernet cards) and/or other devices that facilitate network communications.

In certain embodiments of the invention, one or more workstations 145 may be provided. As desired, these workstations 145 may provide a human machine interface ("HMI") between the system 100 and one or more operators within the system 100. For example, the workstations 145 may facilitate the receipt of user input and/or user commands associated with the operation of any number of controllers 110a-n. Additionally, the workstations 145 may be configured to receive data from the controllers 110a-n and/or the gateway devices, such as presentations and/or other information associated with the connected Fieldbus linking devices 115a-n and Fieldbus devices 120a-n. The workstations 145 may further be configured to display at least a portion of the received data to a user via a suitable display device, such as a monitor. Each workstation 145 may include one or more suitable computers or computing devices, such as personal computers, handheld computing devices, mini-computers, etc. Additionally, the workstations 145 may be in communication with one or more other components of the system 100 via one or more suitable networks 130.

The networks 130 may include any suitable networks and/or combination of networks that facilitate communication between the gateway device 105, the workstations 145, and/or the controllers 110a-n. For example, the networks 130 may include direct links or direct connections, one or more local area networks, one or more wide area networks, the Internet, one or more radio frequency ("RF") networks, one or more Bluetooth™ enabled networks, one or more suitable wired networks, and/or one or more suitable wireless networks.

With continued reference to FIG. 1, at least one external system, such as an asset management system 125, may be provided. An external system may be a suitable processor-driven device configured to identify linking devices 115a-n based upon messages received from the gateway device 105 and/or configured to communicate with the linking devices 115a-n via the gateway device 105. In one example embodiment, the external system may be a suitable asset management system ("AMS"), such as an AMS sold by Emerson Electric Co.™, that is configured to generate a topology of control devices and/or that is configured to manage control devices. In certain embodiments, communications with the external system may utilize virtual addresses in order to identify Fieldbus linking devices 115a-n. In this regard, additional communication capabilities may be provided to the external system. For example, an AMS may be permitted to communicate with a greater number of linking devices 115a-n than can typically be connected to the AMS. As another example, an AMS may be permitted to communicate with linking devices 115a-n across a plurality of Fieldbus networks 135a-n.

As desired, embodiments of the invention may include a system 100 with more or less than the components illustrated in FIG. 1. The system 100 of FIG. 1 is provided by way of example only.

A wide variety of network topologies and configurations may be utilized as desired in various embodiments of the invention. FIGS. 2A-2C are schematic block diagrams of example system topologies 205, 210, 215 that may be utilized in accordance with various embodiments of the invention. The various topologies may be utilized to provide different scalability options and/or support for a wide variety of different networks and/or systems.

Turning to FIG. 2A, a first example topology 205 may associate a single AMS with a single gateway device. The gateway device may then be in communication with any number of controllers. FIG. 2B illustrates a second example topology 210 in which an AMS is associated with a plurality of gateway devices. Each of the gateway devices may then be in communication with respective controllers via respective network connections. FIG. 2C illustrates a third example topology 215 in which multiple AMS devices and gateway devices are connected to a single network connection that facilitates communication with one or more controllers. In other words, FIG. 2C illustrates an example partitioned system in which controllers and linking devices may be partitioned among several gateway devices and AMS devices. A wide variety of other topologies may be utilized as desired in various embodiments of the invention. The topologies 205, 210, 215 illustrated in FIGS. 2A-2C are provided by way of non-limiting example only.

Identification of Fieldbus Devices

In certain embodiments of the invention, a gateway device, such as the gateway device 105 illustrated in FIG. 1, may be configured to provide linking device information to an external system, such as the AMS 125 illustrated in FIG. 1. In this regard, the external system may identify linking devices that are connected within a control system or other system. The AMS 125 may additionally receive messages from and/or direct communications to various linking devices and/or Fieldbus devices associated with the linking devices. In accordance with an aspect of the invention, the gateway device 105 may utilize virtual addresses to represent linking devices to the external system. As desired, multiple linking devices may share a single virtual address. In this regard, the communications capabilities of the external system may be enhanced. For example, if the external system is only capable of directly communicating with eight (8) linking devices, then eight (8) virtual addresses may be utilized to facilitate communications with any number of linking devices that share the eight (8) virtual addresses. Additionally, as a result of utilizing virtual addresses, the external system may be allowed to communicate over any number of Fieldbus networks.

In certain embodiments of the invention, a plurality of redundant linking devices may be provided in order to facilitate communication between Fieldbus devices and a controller and/or gateway device, such as the controller 110 and/or gateway device 105 illustrated in FIG. 1. For example, a primary linking device and a secondary linking device may be provided. In certain embodiments, communication control may be switched between the various redundant linking devices. Conventional AMSs and/or other external systems may not be capable of directly interfacing with redundant linking devices, such as redundant linking device pairs. However, the gateway device 105 may utilize virtual addresses to facilitate identification of redundant linking devices to an AMS and/or communication with the redundant linking devices.

FIG. 3 is a flow diagram of an example method 300 for identifying redundant linking devices and facilitating communication with redundant linking devices, according to an illustrative embodiment of the invention. The method 300 may be performed within a suitable system that utilizes linking devices, such as the system 100 illustrated in FIG. 1. As such, operations of the method 300 may be performed by a suitable gateway device, such as the gateway device 105 illustrated in FIG. 1. The method 300 may begin at block 305.

At block 305, status information for redundant linking devices, such as a pair of redundant linking devices, may be received. A wide variety of suitable methods and/or techniques may be utilized as desired to receive status information. For example, one or more annunciation messages output by one or more of the redundant linking devices and/or by a controller associated with the linking devices may be received. In certain embodiments, annunciation messages may be periodically output by linking devices and/or controllers. The received annunciation messages may then be analyzed or evaluated in order to identify status information for the redundant linking devices. As another example, operational and/or status information associated with the redundant linking devices may be received from the controller.

A wide variety of different types of status information may be received and/or identified as desired in various embodiments of the invention. Examples of suitable status information include, but are not limited to, identifiers of the redundant linking devices, physical addresses of the redundant linking devices, operational status information for the redundant linking devices, an identifier of an active redundant linking device, information associated with one or more linking device segments, identifying information for one or more Fieldbus devices (e.g., Fieldbus device identifiers, etc.), and/or operational status information for one or more Fieldbus devices.

At block 310, a status of each of the redundant linking devices may be determined. For example, the received status information may be evaluated in order to determine a respective operational status associated with each of the redundant linking devices. In certain embodiments, the status for each redundant linking device may indicate whether the linking device is active and/or "online." In other words, the status may indicate whether each of the linking devices is being utilized to facilitate communications with associated Fieldbus devices.

At block 315, a virtual address may be determined by the gateway device 105. The virtual address may be utilized to represent the redundant linking devices. According to an aspect of the invention, a single virtual address may be utilized to represent all of the redundant linking devices. For example, a single virtual address may be utilized to represent a pair of redundant linking devices. In certain embodiments, the virtual address may include a pointer or other reference to a memory location that includes stored information for the redundant linking devices. For example, the virtual address may be utilized to access a routing table that includes the physical address and/or status information for the redundant linking devices. As a result of utilizing a virtual address to identify the redundant linking devices, the plurality of redundant linking devices may be identified by an external system.

At block 320, one or more annunciation messages may be prepared for one or more of the redundant linking devices. For certain linking devices, such as an active linking device, an annunciation message may be prepared by modifying an annunciation message received by the gateway device 105. For example, an annunciation message output by an active linking device or a controller may be received by the gateway device 105, and the received annunciation message may be modified by the gateway device 105 in order to associate the virtual address with the annunciation message. For other linking devices, such as an inactive linking device, an annunciation message may be generated by the gateway device 105, and the virtual address may be associated with the generated annunciation message. An annunciation message may include identification and/or status information associated with a linking device, linking device segments, and/or Fieldbus devices connected to the linking device. Although the gateway device 105 is described above as generating annunciation messages for inactive linking devices, the gateway device 105 may generate annunciation messages for active linking devices as desired.

Once one or more annunciation messages have been prepared, the annunciation messages may be provided at block 325 to an external system, such as an AMS 125 in communication with the gateway device 105. The virtual address may be utilized to identify each of the redundant linking devices. As a result of providing annunciation messages to the external system, the external system may identify the redundant linking devices. In certain embodiments, annunciation messages may be periodically provided or communicated to the external system. In this regard, the external system may generate and/or maintain a relatively accurate representation of the redundant linking devices.

In certain embodiments of the invention, the external system may additionally output messages for communication to at least one of the redundant linking devices. At block 330, a message may be received by the gateway device 105 from the external system. According to an aspect of the invention, the received message may include the virtual address as an identifier of a desired linking device. As desired, the received message may additionally include a wide variety of other information, such as identifying information for one or more Fieldbus devices connected to a desired linking device.

At block 335, the gateway device may determine an identity of a linking device to which the message will be communicated. A wide variety of suitable methods and/or techniques may be utilized as desired to determine an identity of a linking device to which the message will be communicated. For example, the gateway device may utilize the virtual address to access a routing table that includes linking device information, and a suitable linking device may be identified. As desired, status information for the redundant linking devices may be evaluated in order to identify an active linking device as an appropriate linking device to which the message will be communicated. For example, status information received from a controller and/or the linking devices may be evaluated in order to identify an active linking device.

Once an identity of the recipient linking device has been identified, operations may continue at block 340. At block 340, a physical address associated with the linking device may be determined. For example, stored physical address information for the redundant linking devices may be accessed utilizing the virtual address, and a physical address for an active linking device may be selected as a physical address for the recipient linking device. The physical address may include any suitable device address that facilitates communication of the message to the recipient linking device, such as a Media Access Control ("MAC") address or an Ethernet Hardware Address ("EHA"). Once the physical address has been determined for the recipient linking device, the physical address may be associated with the received message. For example, the message may be modified to include the physical address. The modified message may then be output at block 345 for communication to the recipient linking device. For example, the message may be communicated to a controller for distribution to the recipient linking device. As another example, the message may be output onto a Fieldbus network for communication to the recipient linking device.

The method 300 may end following block 345.

The identification of linking devices to an external system and/or the facilitation of communications with the linking devices is not limited to redundant linking devices. Indeed, the gateway device 105 may facilitate linking device identification and/or communication with any combination of linking devices, controllers, and/or Fieldbus networks. FIG. 4 is a flow diagram of an example method 400 for identifying a plurality of linking devices and facilitating communication with the plurality of linking devices, according to an illustrative embodiment of the invention. The method 400 may be performed within a suitable system that utilizes linking devices, such as the system 100 illustrated in FIG. 1. As such, operations of the method 400 may be performed by a suitable gateway device, such as the gateway device 105 illustrated in FIG. 1. The method 400 may begin at block 405.

At block 405, status information for a plurality of linking devices may be received. A wide variety of suitable methods and/or techniques may be utilized as desired to receive status information. For example, one or more annunciation messages output by one or more of the linking devices and/or by a controller associated with the linking devices may be received. In certain embodiments, annunciation messages may be periodically output by linking devices and/or controllers. The received annunciation messages may then be analyzed or evaluated in order to identify status information for the redundant linking devices. As another example, operational and/or status information associated with the linking devices may be received from any number of controllers. A wide variety of different types of status information may be received and/or identified as desired in various embodiments of the invention. Examples of suitable status information include, but are not limited to, identifiers of the linking devices, physical addresses of the linking devices, operational status information for the linking devices, information associated with one or more linking device segments, identifying information for one or more Fieldbus devices (e.g., Fieldbus device identifiers, etc.), and/or operational status information for one or more Fieldbus devices.

At block 410, each of the plurality of linking devices may be identified. For example, the received status information may be evaluated in order to identify the various linking devices. Additionally, in certain embodiments of the invention, respective physical addresses or device addresses (e.g., a MAC address, etc.) may be identified or determined for each of the linking devices. The physical addresses may be suitable device addresses that facilitate communication of messages to the linking devices. At block 415, which may be optional in certain embodiments of the invention, a network associated with each of the linking devices may be identified or determined. For example, information may be received for linking devices that are connected via a plurality of different Fieldbus HSE networks, and a network may be identified for each of the linking devices.

At block 420, which may be optional in certain embodiments of the invention, one or more respective Fieldbus linking devices that are connected to each of the linking devices may be identified or determined. For example, an annunciation message and/or other status information for a linking device may be evaluated in order to identify a Fieldbus device that is connected to the linking device, such as a Fieldbus device connected to a linking device segment. As desired in certain embodiments, the gateway device 105 may communicate any number of messages to a linking device and/or controller to request information associated with connected Fieldbus devices. For example, an annunciation message may be evaluated in order to identify a number of Fieldbus devices connected to a linking device. Based upon the identification, the gateway device 105 may request additional information associated with the Fieldbus devices, such as device identifiers for the Fieldbus devices. In other embodiments, identifying information for Fieldbus devices may be included in the annunciation messages and/or other status information that is received at block 405.

At block 425, one or more virtual addresses may be determined by the gateway device 105 for the plurality of linking devices. The virtual addresses may be utilized to represent the linking devices to an external system, such as the AMS 125 illustrated in FIG. 1. According to an aspect of the invention, a single virtual address may be utilized to represent a plurality of linking devices. For example, a single virtual address may be utilized to represent a plurality of linking devices that communicate via a single Fieldbus network and/or a plurality of linking devices that communicate via a plurality of Fieldbus networks. As desired, however, different virtual addresses may be utilized for different linking devices and/or groups of linking devices. For example, a first virtual address may be utilized to represent one or more linking devices connected via a first Fieldbus network, and a second virtual address may be utilized to represent one or more other linking devices connected via a second Fieldbus network. In certain embodiments, a virtual address may include a pointer or other reference to a memory location that includes stored information for the linking devices. For example, a virtual address may be utilized to access a routing table that includes physical address and/or status information for the linking devices. As another example, a virtual address may be utilized to access a routing table that includes identification information for Fieldbus networks and/or controllers. As a result of utilizing virtual addresses to identify the linking devices, the plurality of linking devices may be identified by the external system. Additionally, the communication capabilities of the external system may be enhanced.

At block 430, information associated with the plurality of linking devices may be stored by the gateway device 105. As desired, at least a portion of the stored information may be utilized to prepare and/or modify identification messages that are communicated to the external system, such as annunciation messages. At least a portion of the stored information may also be utilized to facilitate the routing of communications between the Fieldbus linking devices and the external system. A wide variety of different information may be stored as desired in various embodiments of the invention, including but not limited to, identifiers of the linking devices, physical addresses for the linking devices, virtual addresses for the linking devices, status information for the linking devices, network identification information for the linking devices, and/or information associated with Fieldbus devices connected to the linking devices (e.g., Fieldbus device identifiers, etc.).

At block 435, the gateway device 105 may facilitate the identification of the linking devices by the external system. For example, the gateway device 105 may communicate identification information for the linking devices to the external system. According to an aspect of the invention, the one or more virtual addresses may be utilized to identify the linking devices to the external system. A wide variety of suitable methods or techniques may be utilized as desired to communicate identification information to the external system. For example, in certain embodiments, one or more annunciation messages for the linking devices may be prepared by the gateway device 105, and respective virtual addresses may be associated with the prepared annunciation messages. The annunciation messages may then be output for communication to the external system. As another example, one or more annunciation messages may be received by the gateway device 105 from the linking devices and/or from the linking device controllers. The received annunciation messages may be modified by the gateway device 105 in order to associate the virtual addresses with the messages, and the modified messages may be output for communication to the external system. An annunciation message may include a wide variety of information, such as identification and/or status information associated with a linking device, linking device segments, and/or Fieldbus devices connected to the linking device.

As desired, the gateway device 105 may continually provide identification information for the linking devices to the external system. For example, annunciation messages or other identification messages may be periodically provided to the external system. Once one or more linking devices have been identified to the external system, operations may continue at block 440, and the gateway device 105 may facilitate communications between the external system and any number of the plurality of linking devices. For example, the gateway device 105 may route communications between the linking devices and the external system. A few examples of the operations that may be performed to facilitate communications are described in greater detail below with reference to FIGS. 5 and 6.

The method 400 may end following block 440.

Fieldbus Communication

According to an aspect of the invention, a gateway device may be configured to facilitate communications between an external system, such as the AMS 125 illustrated in FIG. 1, and any number of Fieldbus linking devices. FIG. 5 is a flow diagram of an example method 500 for routing messages from a linking device to an external system, according to an illustrative embodiment of the invention. The method 500 may be performed within a suitable system that utilizes linking devices, such as the system 100 illustrated in FIG. 1. As such, operations of the method 500 may be performed by a suitable gateway device, such as the gateway device 105 illustrated in FIG. 1. The method 500 may begin at block 505.

At block 505, a message output by a Fieldbus linking device may be received by the gateway device 105. In certain embodiments, the message may be received directly from the linking device via one or more suitable Fieldbus networks, such as one of the Fieldbus networks 135a-n illustrated in FIG. 1. In other embodiments, the message may be received from a controller in communication with both the gateway device 105 and the linking device. A wide variety of different types of messages may be received as desired in various embodiments of the invention, such as an annunciation message, a status message, or a message generated in response to another message previously communicated to the linking device.

At block 510, an external system, such as the AMS 125 illustrated in FIG. 1, may be identified as an intended recipient of the message. In certain embodiments, the received message may be evaluated and/or analyzed in order to identify an indicator of a designated recipient, such as an identifier of the external system. For example, a header of the received message may be evaluated in order to identify information designating the external system as an intended recipient of the message. In other embodiments, a determination may be made by the gateway device 105 that the received message should be communicated to the external system even if the external system is not identified in the message. For example, a determination may be made that a received annunciation message should be forwarded to the external system.

At block 515, a virtual address associated with the linking device may be identified. In certain embodiments, identification information for the linking device that is included in the message, such as a physical address or other device identifier, may be utilized to access stored virtual address information and identify a stored virtual address for the linking device. Once the virtual address has been identified, the received message may be modified at block 520 in order to associate the virtual address with the message. For example, a header of the message may be modified in order to replace a physical address of the linking device with the virtual address. As another example, a layer may be added to the message that includes the virtual address.

At block 525, the modified message may be output by the gateway device 105 for communication to the external system. According to an aspect of the invention, the modified message may utilize the virtual address to represent the linking device that originally output the message. In this regard, the external system may identify the linking device by the virtual address. The external system may then utilize the virtual address to communicate a wide variety of messages to the linking device.

The method 500 may end following block 525.

FIG. 6 is a flow diagram of an example method 600 for routing messages from an external system to a linking device, according to an illustrative embodiment of the invention. The method 600 may be performed within a suitable system that utilizes linking devices, such as the system 100 illustrated in FIG. 1. As such, operations of the method 600 may be performed by a suitable gateway device, such as the gateway device 105 illustrated in FIG. 1. The method 600 may begin at block 605.

At block 605, a message output by an external system, such as the AMS 125 illustrated in FIG. 1, may be received by the gateway device 105. A wide variety of suitable network connections and/or communication techniques may be utilized as desired to receive the message. Additionally, a wide variety of different types of messages may be received, such as messages that request operational and/or status information associated with a Fieldbus linking device and/or Fieldbus device, configuration messages associated with a Fieldbus linking device and/or Fieldbus device, and/or instruction or control messages.

At block 610, a virtual address included in the received message may be identified. For example, a header of the message may be evaluated or analyzed in order to identify a virtual address that is representative of an intended recipient linking device for the message. At block 615, a determination may be made as to whether the message may be routed by the gateway device 105 based upon the virtual address without the gateway device 105 determining a physical address for the intended recipient linking device. In other words, a determination may be made as to whether the message may be routed to a next node within a communications network, such as a controller that is configured to identify a physical address of the intended recipient linking device.

If it is determined at block 615 that the message may not be routed without determining a physical address, then operations may continue at block 630 described in greater detail below. If, however, it is determined at block 615 that the message may be routed without determining a physical address of the intended recipient linking device, then operations may continue at block 620. At block 620, the virtual address may be evaluated in order to identify a next device to which the message will be routed. For example, the virtual address may be evaluated in order to identify a controller or Fieldbus network associated with the linking device. In certain embodiments, a portion of a virtual address may be utilized to identify the Fieldbus network or controller. As a result, relatively efficient routing may be achieved by having the gateway device 105 analyze the relevant portion of the virtual address and route the message based upon the analysis.

Once a controller or network associated with the linking device has been determined at block 620, operations may continue at block 625, and the message may be routed based upon the determination. For example, the message may be routed to an identified controller. As another example, a controller associated with an identified network may be determined, and the message may be routed to the relevant controller. In certain embodiments, once the message has been routed, the recipient controller may evaluate the message in order to identify a relevant linking device, and the recipient controller may direct communication of the message to the relevant linking device. Operations may then end following block 625.

At block 630, which may be reached from block 615 if it is determined that the gateway device 105 will determine a physical address, the gateway device 105 may evaluate the message in order to identify a physical device that is an intended recipient of the message. For example, the gateway device 105 may evaluate the message in order to identify information associated with a linking device and/or information associated with a Fieldbus device. In one example embodiment, the gateway device 105 may evaluate the message in order to determine a device identifier for a Fieldbus device.

At block 635, a linking device may be identified as a linking device to which the message will be communicated. For example, in the event that a single linking device is associated with the virtual address, the virtual address may be utilized to identify the linking device. As another example, in the event that a plurality of linking devices are associated with a virtual address, identifying information included in the message may be utilized to select an appropriate linking device for routing the message. For example, an identifier of a Fieldbus device included in the message may be utilized to select a linking device that is associated with the Fieldbus device.

Once a linking device has been identified, operations may continue at block 640. At block 640, a physical address associated with the identified linking device may be determined. In certain embodiments, one or more routing tables may be accessed utilizing the virtual address and/or various selection criteria (e.g., an identifier of a Fieldbus device, etc.) in order to determine a physical address associated with the linking device. Once the physical address has been determined, operations may continue at block 645, and the message may be output for communication to the identified linking device utilizing the physical address to identify the linking device. For example, the message may be directly communicated to the linking device. As another example, the message may be communicated to a controller associated with the linking device, and the controller may facilitate forwarding of the message to the linking device.

The method 600 may end following either block 625 or block 645.

In certain embodiments of the invention, a gateway device may be configured to provide write protection for linking devices and/or Fieldbus devices. For example, a gateway device may allow an external system, such as the AMS 125 illustrated in FIG. 1, to collect identification and/or operational information associated with the linking devices (and their connected Fieldbus devices); however, the gateway device may limit the ability of the external system to configure or otherwise write data to the linking devices and/or associated Fieldbus devices. In certain embodiments, an AMS may be utilized to generate and/or maintain a control system topology and another device or system, such as one or more workstations and/or a toolbox system, may be utilized to configure Fieldbus linking devices and Fieldbus devices.

FIG. 7 is a flow diagram of an example method 700 for providing write protection for Fieldbus linking devices and Fieldbus devices, according to an illustrative embodiment of the invention. The method 700 may be performed within a suitable system that utilizes linking devices, such as the system 100 illustrated in FIG. 1. As such, operations of the method 700 may be performed by a suitable gateway device, such as the gateway device 105 illustrated in FIG. 1. The method 700 may begin at block 705.

At block 705, a message output by an external system, such as the AMS 125 illustrated in FIG. 1, may be received by the gateway device 105. A wide variety of suitable network connections and/or communication techniques may be utilized as desired to receive the message. Additionally, a wide variety of different types of messages may be received, such as messages that request operational and/or status information associated with a Fieldbus linking device and/or Fieldbus device, configuration messages associated with a Fieldbus linking device and/or Fieldbus device, and/or instruction or control messages.

At block 710, a message type associated with the received message may be determined. A wide variety of suitable methods and/or techniques may be utilized as desired to determine a message type. For example, a header associated with the received message may be evaluated and/or analyzed in order to identify one or more commands or requested operations included in the message. A message type may then be determined based upon the identified commands and/or operations.

At block 715, a determination may be made as to whether the received message includes one or more write commands or requested write operations. For example, a determination may be made as to whether the received message will result in a write operation if the message is forwarded to a linking device and/or a Fieldbus device connected to the linking device. If it is determined at block 715 that the message includes a write command, then operations may continue at block 720, and the gateway device 105 may generate an exception associated with the message. The exception may indicate that the requested write command is not permitted. As desired, an error message may be generated by the gateway device 105 indicating that a desired write operation is not permitted, and the generated error message may be communicated to the external system.

If, however, it is determined at block 715 that the message does not include one or more write commands, then operations may continue at block 725. At block 725, the gateway device 105 may direct communication of the message to an appropriate linking device. In certain embodiments, operations similar to those described above with reference to FIG. 6 may be utilized to facilitate the routing of the message to an appropriate linking device.

The method 700 may end following either block 720 or block 725.

In certain embodiments of the invention, such as embodiments in which an AMS is utilized to generate a control system topology or other representation of available Fieldbus devices, it may be desirable to provide identification information for offline linking devices to the AMS. In this regard, a relatively accurate representation of the connected devices may be generated or prepared. FIG. 8 is a flow diagram of an example method 800 for identifying both online and offline linking devices, according to an illustrative embodiment of the invention. The method 800 may be performed within a suitable system that utilizes linking devices, such as the system 100 illustrated in FIG. 1. As such, operations of the method 800 may be performed by a suitable gateway device, such as the gateway device 105 illustrated in FIG. 1. The method 800 may begin at block 805.

At block 805, which may be optional in certain embodiments of the invention, the gateway device 105 may receive an indication that a linking device topology will be assembled by an external system, such as the AMS 125 illustrated in FIG. 1. For example, a message may be received indicating that an AMS 125 is determining a group of linking devices connected within a control system for asset management purposes.

At block 810, a plurality of linking devices may be identified. For example, a plurality of linking devices connected within a control system may be identified. A wide variety of suitable methods and/or techniques may be utilized as desired to identify the plurality of linking devices. For example, status information for a plurality of linking devices (e.g., annunciation messages, status information output by one or more controllers, etc.) may be received, and the status information may be evaluated in order to identify the various linking devices.

At block 815, a next linking device included in the plurality of linking devices may be selected for evaluation and/or processing. At block 820, an operational status associated with the selected linking device may be determined. For example, the status information received from the selected linking device may be evaluated in order to determine an operational status for the linking device. In certain embodiments, the operational status may indicate whether the selected linking device is "online" or "offline." For example, the operational status may indicate whether or not the selected linking device is connected and functioning properly.

At block 825, a determination may be made as to whether the selected linking device has an "online" status. If it is determined at block 825 that the selected linking device has an "online" status, then operations may continue at block 830. At block 830, status information for the linking device may be identified. For example, an annunciation message output by the linking device and/or status information output by a controller associated with the linking device may be identified. At least a portion of the status information may be identified as status information to be communicated to the external system. A wide variety of status information may be identified as desired in block 830, including but not limited to, identifiers of the linking devices, physical and/or virtual addresses of the linking devices, operational status information for the linking devices, information associated with one or more linking device segments, identifying information for one or more Fieldbus devices (e.g., Fieldbus device identifiers, etc.), and/or operational status information for one or more Fieldbus devices. Following block 830, operations may continue at block 840 described in greater detail below.

If, however, it is determined at block 825 that the selected linking device does not have an "online" status, then operations may continue at block 835. At block 835, an annunciation message may be generated for the "offline" linking device. The annunciation message may include a wide variety of status information for the linking device, such as at least a portion of the information described above with reference to block 830. As a result of generating an annunciation message for an "offline" linking device, identification information for the linking device may be provided to the external system. In this regard, the external system may generate a relatively accurate topology of the linking devices connected within a control system. Following block 835, operations may continue at block 840.

At block 840, which may be reached from either block 830 or block 835, a status message for the selected linking device may be communicated to the external system. The status message may include status information received by the gateway device 105 and/or status information generated by the gateway device 105. Following the communication of the status information at block 840, operations may continue at block 845, and a determination may be made as to whether the end of the plurality of linking devices has been reached. If it is determined at block 845 that the end of the plurality of linking devices has been reached, then the method 800 may end. Otherwise, operations may continue at block 815, and a next linking device may be selected for processing.

The method 800 may end following block 845.

The operations described in the methods 300, 400, 500, 600, 700, 800 of FIGS. 3-8 do not necessarily have to be performed in the order set forth in FIGS. 3-8, but instead may be performed in any suitable order. Additionally, in certain embodiments of the invention, more or less than all of the elements or operations set forth in FIGS. 3-8 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   identifying, by a gateway device comprising one or more computers, a plurality of Foundation Fieldbus redundant linking devices;
   determining, by the gateway device, a single virtual address representative of the plurality of Foundation Fieldbus redundant linking devices,
   routing, by the gateway device, a message based on the single virtual address to a controller connected to the plurality of Foundation Fieldbus redundant linking devices, without the gateway device determining a physical address of the one of the plurality of Foundation Fieldbus redundant linking devices, wherein the controller is configured to identify the physical address of the one of the plurality of Foundation Fieldbus redundant linking devices; and
   facilitating, by the gateway device, communications between the plurality of Foundation Fieldbus redundant linking devices and an external system, wherein the single virtual address is utilized to represent the plurality of Foundation Fieldbus redundant linking devices to the external system.

2. The method of claim 1, wherein identifying the plurality of Foundation Fieldbus redundant linking devices comprises receiving status information for the redundant linking devices from a controller that manages the redundant linking devices.

3. The method of claim 1, further comprising:
   generating, by the gateway device, an annunciation message for one of the plurality of redundant linking devices; and
   providing, by the gateway device to the external system, the generated annunciation message.

4. The method of claim 1, wherein facilitating communications between the plurality of redundant linking devices and an external system comprises:
   receiving, by the gateway device, a message output by one of the plurality of redundant linking devices;
   modifying, by the gateway device, the message in order to associate the virtual address with the message; and
   providing, by the gateway device, the modified message to the external system.

5. The method of claim 4, wherein receiving a message output by one of the plurality of redundant linking devices comprises receiving one of (i) a message associated with operation of the one of the plurality of redundant linking devices or (ii) a message associated with a Foundation Fieldbus device connected to the one of the plurality of redundant linking devices.

6. The method of claim 1, further comprising:
   receiving, by the gateway device from the external device, a message to be communicated to one of the plurality of redundant linking devices, the received message identifying the one of the plurality of redundant linking devices by the virtual address;
   determining, by the gateway device, a physical address associated with the one of the plurality of redundant linking devices; and
   directing, by the gateway device based at least in part upon the determined physical address, communication of the message to the one of the plurality of redundant linking devices.

7. The method of claim 6, further comprising:
   determining, by the gateway device based at least in part upon an analysis of the received message, an identity of the one of the plurality of redundant linking devices,
   wherein determining the physical address comprises determining the physical address based at least in part upon the determined identity.

8. The method of claim 7, wherein determining an identity of the one of the plurality of redundant linking devices comprises:
   identifying, based at least in part upon the analysis of the received message, a Foundation Fieldbus device that is an intended recipient of the received message; and
   identifying the one of the plurality of redundant linking devices as a linking device to which the Foundation Fieldbus device is connected.

9. A system comprising:
   at least one memory operable to store computer-executable instructions;
   at least one processor configured to access the at least one memory and execute the computer-executable instructions to:
      identify a plurality of Foundation Fieldbus redundant linking devices;
      determine a single virtual address representative of the plurality of Foundation Fieldbus redundant linking devices;
      route, by a gateway device, a message based on the single virtual address to a controller connected to the plurality of Foundation Fieldbus redundant linking devices, without the gateway device determining a physical address of the one of the plurality of Foundation Fieldbus redundant linking devices, wherein the controller is configured to identify the physical address of the one of the plurality of Foundation Fieldbus redundant linking devices; and
      facilitate communications between the plurality of Foundation Fieldbus redundant linking devices and an external system, wherein the single virtual address is utilized to represent the plurality of Foundation Fieldbus redundant linking devices to the external system.

10. The system of claim 9, wherein the at least one processor is configured to identify the plurality of Foundation Fieldbus redundant linking devices based upon an analysis of status information for the redundant linking devices received from a controller that manages the redundant linking devices.

11. The system of claim 9, wherein the at least one processor is further configured to execute the computer-executable instructions to:
   generate an annunciation message for one of the plurality of redundant linking devices; and
   direct communication of the generated annunciation message to the external system.

12. The system of claim 9, wherein the at least one processor is configured to facilitate communications by executing the computer-executable instructions to:

receive a message output by one of the plurality of redundant linking devices;

modify the message in order to associate the virtual address with the message; and direct communication of the modified message to the external system.

13. The system of claim 12, wherein the received message comprises one of (i) a message associated with operation of the one of the plurality of redundant linking devices or (ii) a message associated with a Foundation Fieldbus device connected to the one of the plurality of redundant linking devices.

14. The system of claim 9, wherein the at least one processor is further configured to execute the computer-executable instructions to:

receive, from the external device, a message to be communicated to one of the plurality of redundant linking devices, the received message identifying the one of the plurality of redundant linking devices by the virtual address;

determine a physical address associated with the one of the plurality of redundant linking devices; and direct, based at least in part upon the determined physical address, communication of the message to the one of the plurality of redundant linking devices.

15. The system of claim 14, wherein the at least one processor is further configured to execute the computer-executable instructions to:

determine, based at least in part upon an analysis of the received message, an identity of the one of the plurality of redundant linking devices; and determine the physical address based at least in part upon the determined identity.

16. The system of claim 15, wherein the at least one processor is further configured to execute the computer-executable instructions to:

identify, based at least in part upon the analysis of the received message, a Foundation Fieldbus device that is an intended recipient of the received message; and identify the one of the plurality of redundant linking devices as a linking device to which the Foundation Fieldbus device is connected.

17. A method comprising:

identifying, by a gateway device comprising one or more computers, a plurality of Foundation Fieldbus redundant linking devices;

determining, by the gateway device, a single virtual address representative of the plurality of Foundation Fieldbus redundant linking devices;

routing, by the gateway device, a message based on the single virtual address to a controller connected to the plurality of Foundation Fieldbus redundant linking devices, without the gateway device determining a physical address of the one of the plurality of Foundation Fieldbus redundant linking devices, wherein the controller is configured to identify the physical address of the one of the plurality of Foundation Fieldbus redundant linking devices; and providing, by the gateway device to an external system, information associated with operation of at least one of the plurality of Foundation Fieldbus redundant linking devices, wherein the single virtual address is utilized to represent the at least one of the plurality of Foundation Fieldbus redundant linking devices.

18. The method of claim 17, wherein providing information associated with operation of at least one of the plurality of redundant linking devices comprises providing information to an asset management system.

19. The method of claim 17, further comprising:

receiving, by the gateway device from the external device, a message to be communicated to the at least one of the plurality of redundant linking devices;

determining, by the gateway device, a physical address associated with the at least one of the plurality of redundant linking devices; and directing, by the gateway device, communication of the message to the at least one of the plurality of redundant linking devices.

20. The method of claim 17, further comprising:

determining, by the gateway device based at least in part upon an analysis of the received message, an identity of the at least one of the plurality of redundant linking devices, wherein determining a physical address comprises determining the physical address based at least in part upon the determined identity.

* * * * *

UNITED STATES PATENT AND TRADEMARK OFFICE
CERTIFICATE OF CORRECTION

PATENT NO.        : 8,713,166 B2
APPLICATION NO.   : 13/159152
DATED             : April 29, 2014
INVENTOR(S)       : Smith et al.

Page 1 of 1

It is certified that error appears in the above-identified patent and that said Letters Patent is hereby corrected as shown below:

Title Page, Item (75), under "Inventors", in Column 1, Line 3, delete "(Christianburg," and insert -- Christiansburg, --, therefor.

Title Page, Item (57), under "ABSTRACT", in Column 2, Line 8, delete "may the be" and insert -- may be --, therefor.

In the Specification

In Column 9, Line 57, delete "device 105," and insert -- device 105 --, therefor.

In the Claims

In Column 25, Line 23, in Claim 1, delete "devices," and insert -- devices; --, therefor.

In Column 26, Line 38, in Claim 9, delete "by a gateway" and insert -- by the gateway --, therefor.

Signed and Sealed this
Fifteenth Day of March, 2016

Michelle K. Lee
*Director of the United States Patent and Trademark Office*